United States Patent
Lu

(10) Patent No.: US 9,029,717 B2
(45) Date of Patent: May 12, 2015

(54) WIRELESS TRANSMISSION METHOD FOR TOUCH PEN WITH WIRELESS STORAGE AND FORWARDING CAPABILITY AND SYSTEM THEREOF

(75) Inventor: Ho-Lung Lu, New Taipei (TW)

(73) Assignee: Dexin Corporation, New Taipei (TW)

( * ) Notice: Subject to any disclaimer, the term of this patent is extended or adjusted under 35 U.S.C. 154(b) by 639 days.

(21) Appl. No.: 13/304,335

(22) Filed: Nov. 24, 2011

(65) Prior Publication Data

US 2013/0050101 A1 Feb. 28, 2013

(30) Foreign Application Priority Data

Aug. 24, 2011 (TW) .............................. 100130362 A

(51) Int. Cl.
*G06F 3/033* (2013.01)
*G06F 3/0354* (2013.01)
*G06F 3/0488* (2013.01)
*G06F 3/038* (2013.01)

(52) U.S. Cl.
CPC .......... *G06F 3/03545* (2013.01); *G06F 3/0488* (2013.01); *G06F 3/038* (2013.01); *G06F 2203/0384* (2013.01)

(58) Field of Classification Search
CPC .................... G06F 2203/0384; G06F 3/03545; G06F 3/038; G06F 3/0488
USPC ............. 345/2.3, 173–179; 178/18.01–20.04; 455/566, 151.2, 186.2
See application file for complete search history.

(56) References Cited

U.S. PATENT DOCUMENTS

| 5,321,584 | A | * | 6/1994 | Matheny | 361/752 |
|---|---|---|---|---|---|
| 6,563,494 | B1 | * | 5/2003 | Eichstaedt et al. | 345/179 |
| 2003/0038790 | A1 | * | 2/2003 | Koyama et al. | 345/179 |
| 2006/0192772 | A1 | | 8/2006 | Kambayashi | |
| 2009/0023435 | A1 | * | 1/2009 | Kuivalainen | 455/419 |
| 2011/0163964 | A1 | * | 7/2011 | Cho | 345/173 |
| 2012/0139865 | A1 | * | 6/2012 | Krah et al. | 345/174 |

FOREIGN PATENT DOCUMENTS

| TW | 201041331 A1 | 11/2010 |
|---|---|---|
| TW | 201122984 A1 | 7/2011 |

* cited by examiner

*Primary Examiner* — Kent Chang
*Assistant Examiner* — Gerald Oliver
(74) *Attorney, Agent, or Firm* — Li & Cai Intellectual Property (USA) Office

(57) ABSTRACT

The invention provides a wireless transmission method for a touch pen with wireless storage and forwarding capability. The wireless transmission method comprises the touch pen wireless receiving at least a record extracted from a displaying data area by a touch device when the touch pen touches to select the data display region shown on a touch screen of the touch device, and the touch pen storing the record. Accordingly, the touch pen can receive data from the touch device according to touch-control of the user.

10 Claims, 13 Drawing Sheets

WIRELESS TRANSMISSION METHOD FOR TOUCH PEN WITH WIRELESS STORAGE AND FORWARDING CAPABILITY AND SYSTEM THEREOF

BACKGROUND OF THE INVENTION

1. Field of the Invention

The present invention relates to a human machine interface; in particular, to a wireless transmission method for a touch pen with wireless storage and forwarding capability and system thereof.

2. Description of Related Art

According to the progress of the touch-control technology, the human machine interface for most of the smart phones and the touchpads is the touch interface. The operation manner of touch-control can replace most functions of the keyboards and the mice. The operation method of touch-control is a more intuitive human machine interface, and the operation manner of touch-control can be cooperated with the graphical interface of the touch device to replace the function of the mouse cursor, or even the text input. Therefore, a human operator can learn how to operate the touch device easily.

Thus, it can be seen that the progress of the human machine interface develops towards a user-friendly interface and makes use of the human senses as much as possible. Generally, the resolution of the touch screen varies according to the application conditions, and the touch screen may be touch-controlled by a hand of the human operator or a touch pen. For example, the touch screen of the automated teller machine can be touch-controlled by the hand of the human operator; however, the human operator may use a touch pen to accomplish more accurate input such as, handwriting recognition or drawing for the tablet computer or the smart phone.

The touch pen usually has a small size, and can also be easily stored in the touch device. However, according to the development of the human machine interface for the touch device, the traditional touch pen may not sufficient for the future demand of convenience for operating the touch device.

SUMMARY OF THE INVENTION

The object of the present invention is to provide a more intuitive human machine interface, for a human operator using the touch pen with wireless storage and forwarding capability to store and to forward data between multiple information devices. The information devices are a kind of platform with wireless communication capability.

In order to achieve the aforementioned objects, according to an embodiment of the present invention, a wireless transmission method for a touch pen with wireless storage and forwarding capability is offered. The wireless transmission method comprises the touch pen wireless receiving at least a record extracted from a displaying data area by a touch device when the touch pen touches to select the data display region shown on a touch screen of the touch device, and the touch pen storing the record.

In order to achieve the aforementioned objects, according to an embodiment of the present invention, a touch system is offered. The touch system comprises a touch device and a touch pen. The touch device has a touch screen. The touch pen comprises a wireless communication module and a memorizing unit. The wireless communication module is for receiving a record from the touch device through a wireless communication channel. The memorizing unit is for storing the record. The touch device transmits the record to the touch pen through the wireless communication channel according to the touch-control of the touch pen.

In summary, the wireless transmission method for a touch pen with wireless storage and forwarding capability and system thereof let the touch pen receive the record (or data) stored in the touch device by the touch operation of the human operator. Accordingly, the human operator can intuitively manipulate the touch pen to make data transmission when the human operator is using the touch pen to touch-control the touch device.

In order to further understand the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

First Embodiment

Firstly, in this embodiment, outlining a wireless transmission method for a touch pen with wireless storage and forwarding capability and system thereof for highlighting that the invention can provide a more intuitive human machine interface for the human operator. The human operator can share information (e.g. data or record) or manipulate multimedia information more effectively and intuitively when using a plurality of personal information devices. The mentioned personal information devices can be devices with wireless capability such as, a desktop, a cell phone, a personal digital assistant (PDA), a tablet computer, a notebook, or a smart home appliance . . . etc. Additionally, the convenience of personal voice communications for the tablet computer with voice communication capability may be increased.

Figure 1A:
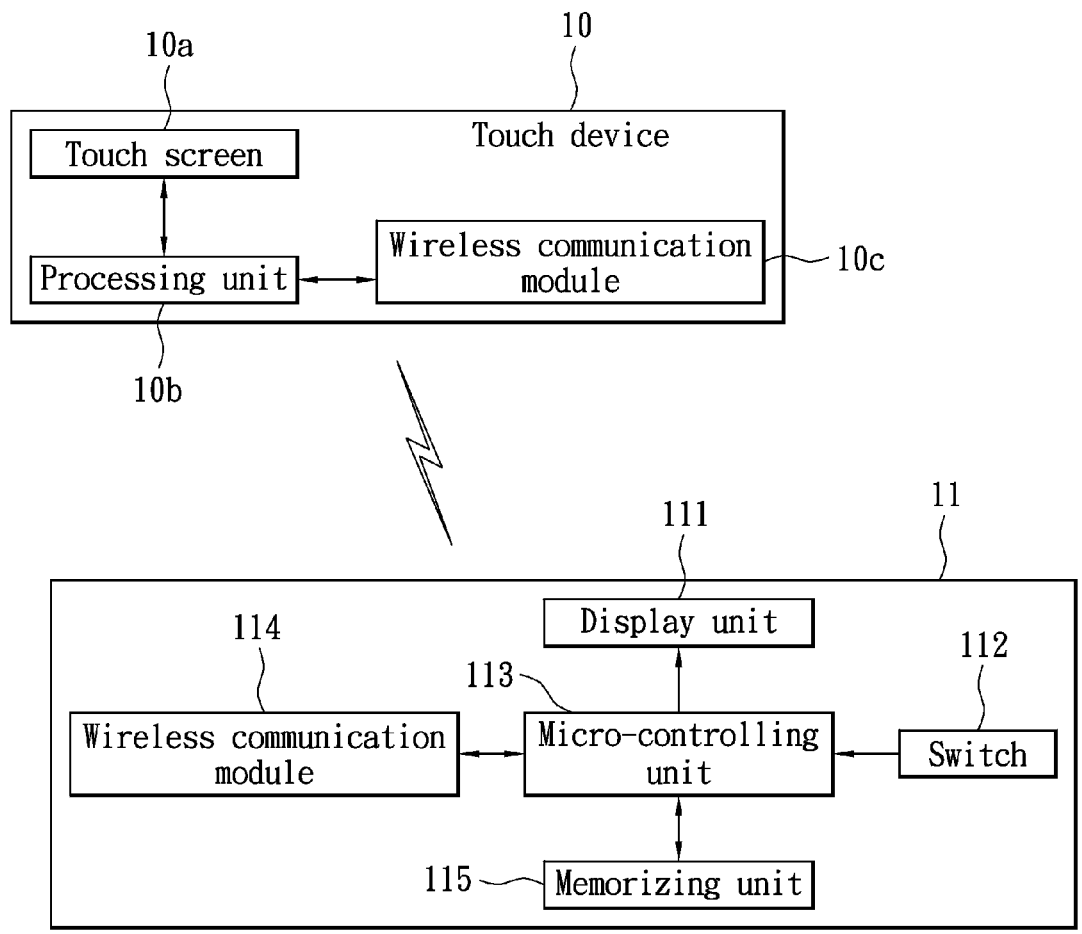
FIG. 1A shows a block diagram of a touch system according to a first embodiment of the present invention.
Figure 1B:
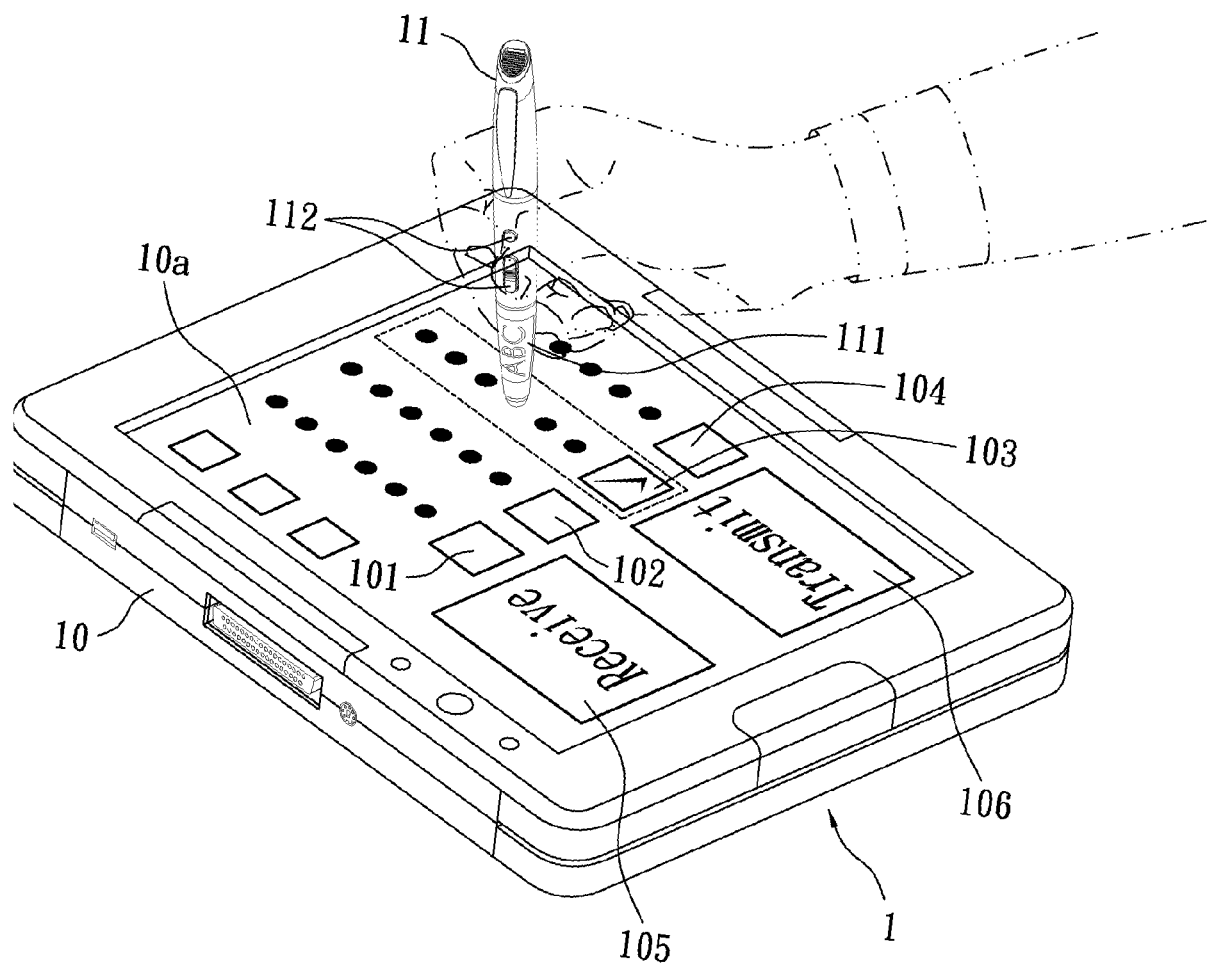
FIG. 1B shows a schematic diagram of a touch system according to a first embodiment of the present invention.

Please refer to FIG. 1A and FIG. 1B, FIG. 1A shows a block diagram of a touch system according to a first embodiment of the present invention, FIG. 1B shows a schematic diagram of a touch system according to a first embodiment of the present invention. A touch system 1 comprises a touch device 10 and a touch pen with wireless storage and forwarding capabilities 11. The touch device comprises a touch screen 10a, a processing unit 10b, and a wireless communication module 10c. The touch pen comprising a display unit 111, a switch 112, a micro-controlling unit 113, a wireless communication module 114, and a memorizing unit 115.

The processing unit 10b of the touch device 10 controls the touch screen 10a to display data. The touch device 10 can also process the data according to the touch-control of the human operator received by the touch screen 10a. The touch device 10 can control the wireless communication module 10c to communicate with the touch pen 11.

The wireless communication module 114 of the touch pen 11 is controlled by the micro-controlling unit 113 to communicate with the touch device 10. The micro-controlling unit 113 can control the display unit 111 to display the data stored in the memorizing unit 115 or the data received by the wireless communication module 114. The memorizing unit 115 is controlled by the micro-controlling unit 113 to store the data received by the wireless communication module 114. The micro-controlling unit 113 can be controlled by the switch 112, thus the human operator can control the micro-controlling unit 113 through operating the switch 112 for example, the human operator can adjust the data displayed by the display unit 111 by operating the switch 112; however, the invention is not restricted thereto.

Please refer to FIG. 1B again, the touch system 1 comprises the touch device 10 and the touch pen 11. The touch device 10 comprises the touch screen 10a, and the touch screen 10a can display the user interface (UI) of a wireless communication software of the touch pen 11 and the touch device 10 for the human operator to control. The mentioned wireless communication software can be an application program installed in the touch device 10. It is worth mentioning that, the touch device 10 can be a platform with touch-control and wireless communication capability such as, a desktop, a cell phone, a personal digital assistant (PDA), a tablet computer, or a notebook.

Please refer to FIG. 1B again, the touch screen 10a displays displaying data areas 101~104 and feature icons 105, 106. The displaying data area 104~104 is for displaying the information wanted to be seen by the human operator such as, the time, a phone book, or a song name. The feature icons 105, 106 can be touched by the touch pen 11 to execute the corresponding software or functions of hardware. For example, the feature icon 105 shown in FIG. 1B is for the touch device 10 to wirelessly receive the data from the touch pen 11.

Please refer to FIG. 1B again, the touch pen 11 comprises the display unit 111, the switch 112, the wireless communication module (not shown), and the memorizing unit (not shown). Additionally, the touch pen 11 usually has a touch head, and the design of the touch head varies according to the corresponding touch device (capacitive type, resistive type, or inductive type), and an artisan of ordinary skill in the art will appreciate how to embody the touch head; there's no need to go to detail.

The display unit 111 shows the data received or transmitted by the touch pen 11 through the wireless communication module. The display unit 111 can be a LCD, or an electronic paper. The switch 112 can change the operation status of the touch pen 11. The switch 112 can be an electronic switch or a mechanical switch such as, a push button, a roller, or a slide switch or an electronic switch. The switch 112 shown in FIG. 2B is an exemplary embodiment, but the invention is not restricted thereto. The switch 112 may have a polarity of different kinds of switches, or the touch pen 11 may have a plurality of switches 112 with different functions.

The wireless communication module of the touch pen 11 is for wireless transmitting data, thus the touch pen 11 can receive the data from the touch device 10, or the touch pen 11 can transmit the mentioned data to the touch device 10. The memorizing unit is for storing the data from the touch device 10 or the data used for transmitting to the touch device 10 or other device with wireless communication capability.

Figure 1C:
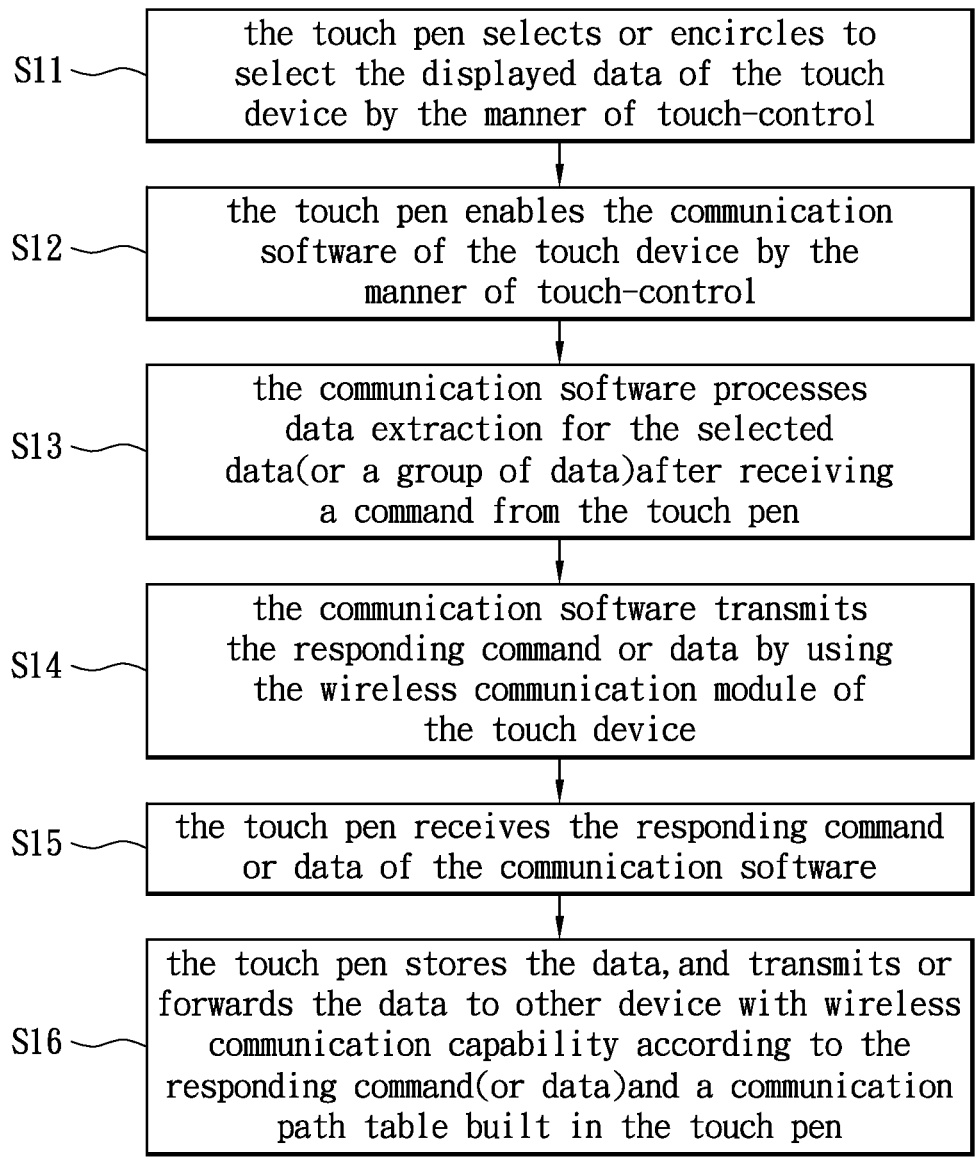
FIG. 1C shows a flow chart of a wireless transmission method for a touch pen with wireless storage and forwarding capability according to a first embodiment of the present invention.

Please refer to FIG. 1A and FIG. 1C, FIG. 1C shows a flow chart of a wireless transmission method for a touch pen with wireless storage and forwarding capability according to a first embodiment of the present invention. The main concept of storage and forwarding by utilizing the touch pen 11 is shown in the flow chart of FIG. 1C. In step S11, the touch pen 11 selects or encircles to select the displayed data of the touch device 10 by the manner of touch-control. For example, the touch pen 11 encircles to select the displaying data area 103 of the touch device 10.

In step S12, the touch pen 11 enables the communication software of the touch device 10 by the manner of touch-control. The operation of enabling the communication software may be the gesture made by the touch pen 11 or that the touch pen 11 touches to select the button displayed by the user interface. The mentioned communication software can display the user interface of the communication status and control the communication between the touch pen 11 and the touch device 10. The user interface can be exemplary as the displaying data areas 101~104 and the feature icons 105~106.

In step S13, the communication software processes data extraction for the selected data (or a group of data) after receiving a command from the touch pen 11. In other words, the communication software extracts the data selected in the step S11 after being enabled in the step S12. It is worth mentioning that the sequence of the steps S11, S12 may be exchanged, thus the human operator can manipulate the touch pen 11 to enable the communication software (step S12) and select data (step S11). According to the steps S11, S12, an artisan of ordinary skill in the art will appreciate how to design the executing process of the communication software and to cooperate with the operation system or platform of the touch device 10 to make the communication software execute the step S13.

In the step S14, the communication software transmits the responding command or data by using the wireless communication module 10c of the touch device 10. The mentioned command or data can be exemplary as follows: (1) updating the function for the switch 112 of the touch pen, or updating the firmware of the touch pen; (2) synchronizing the address books of the touch pen 11 and the touch device 10; (3) making the touch pen 11 forward the command or data to other device with wireless communication capability such as, a smart home appliance; (4) making the touch pen 11 display the data (on the display unit 111), or making the touch pen 11 forward the data to a device with wireless communication capability (e.g. a cell phone) for displaying the data; (5) making the touch pen 11 receive an audio streaming from the touch device 10 such as, an audio streaming of the 3rd generation mobile telecommunications. However, the mentioned command and the data are not restricted thereto.

In step S15, the touch pen 11 receives the responding command or data of the communication software. In other words, the wireless communication module 114 of the touch pen 11 receives the command or data transmitted by the touch device 10 in the step S14. The mentioned command may comprise updating the function for the switch 112 of touch pen 11, updating the firmware of the touch pen 11, synchronizing the address books of the touch pen 11 and the touch device 10, a command for forwarding the data, a command for displaying the data, or a command for switching the voice communications . . . etc.

In step S16, the touch pen 11 stores the data, and transmits or forwards the data to other device with wireless communication capability according to the responding command (or data) and a communication path table built in the touch pen 11. For example, when the touch pen 11 has stored the data, the human operator can make the touch pen 11 forward the data to the device with wireless communication capability by operating the switch 111 of the touch pen 11. The mentioned communication path table is essential information for communication after that wireless communication channels are established between the touch pen 11 and any other device with wireless communication capabilities. When the touch pen 11 needs to link to a device with wireless communication capability to transmit data, the touch pen 11 can initiate the transmission according to the communication path table. According to aforementioned descriptions, the follow-up embodiments are derivative from the concept disclosed by the steps S11~S16.

Figure 2:
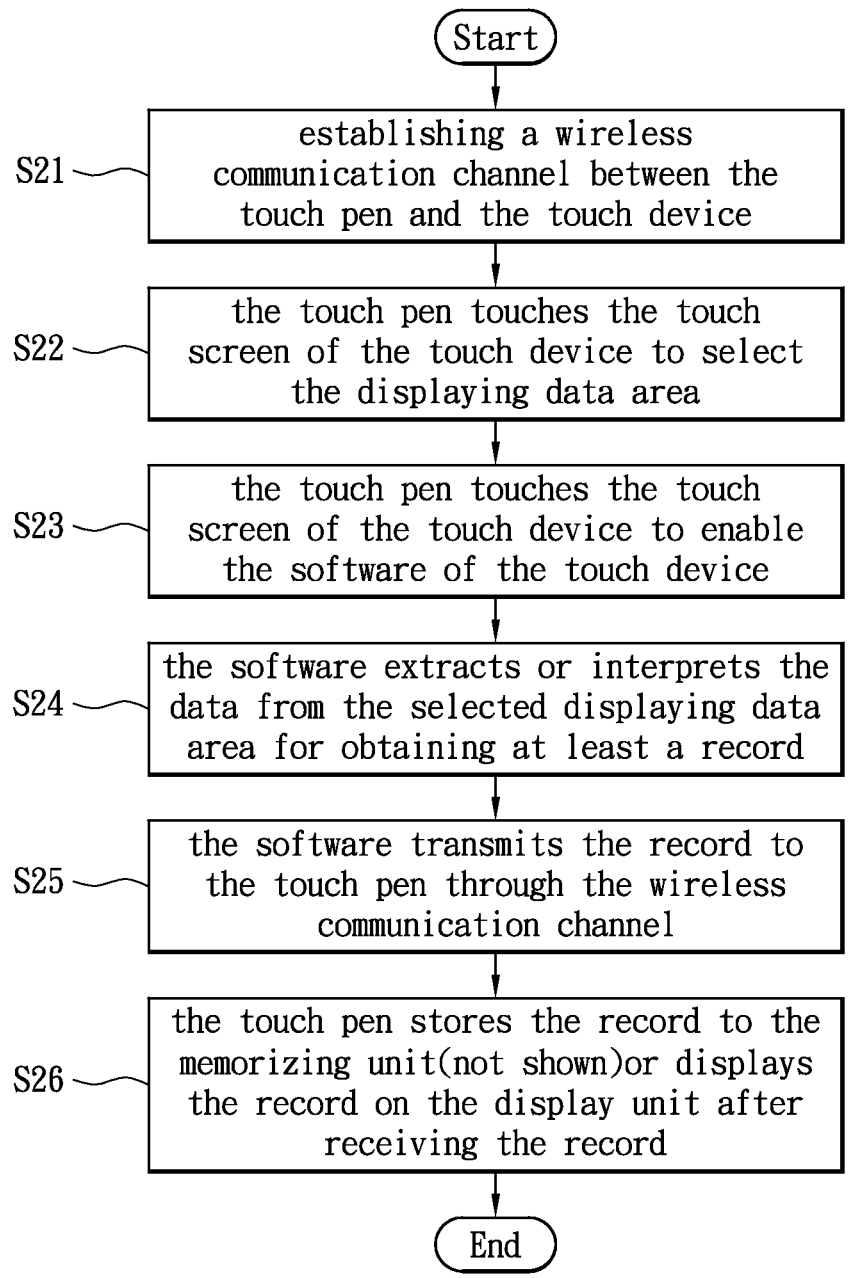
FIG. 2 shows a flow chart of a wireless transmission method for a touch pen with wireless storage and forwarding capability according to a first embodiment of the present invention.

Please refer to FIG. 1A, FIG. 1B and FIG. 2, FIG. 2 shows a flow chart of a wireless transmission method for a touch pen with wireless storage and forwarding capability according to a first embodiment of the present invention. In step S21, establishing a wireless communication channel between the touch pen 11 and the touch device 10, the wireless transmission modules of the touch device 10 and the touch pen 11 can use channels which correspond with specifications of the Bluetooth, WiFi, or Zigbee. In step S22, the touch pen 11 touches the touch screen 10a of the touch device 10 to select the displaying data area 103. The manner of the touch-control touch screen 10a can be touching or encircling to select the displaying data area 103 by the touch pen 11. In step S23, the touch pen 11 touches the touch screen 10a of the touch device 10 to enable the software of the touch device 10. It is worth mentioning that the software is the communication software in the steps S11~S16 shown in FIG. 1C.

In step S24, the software extracts or interprets the data from the selected displaying data area 103 for obtaining at least a record. In this embodiment, three examples are illustrated as follows, but the invention is not restricted thereto. The first example: when the content displayed by the displaying data area 103 comprises a sentence, a word, an internet link, a picture, or an image, the software can extract the sentence, the word, the internet link, a picture, or an image of the displaying data area 103 to produce at least a record. The second example: when the content displayed by the displaying data area 103 comprises an icon of a file or a folder which should be interpreted before making use of, the software can interpret the icon of the file or the folder to form a record representing the content (which may includes the properties of the file) of the file or the folder. The third example: when the displaying data area 103 shows an address book, the software can comprehend to make the extraction process or the interpretation process for obtaining a record. The mentioned data may be a button menu of the switch 112 or the data described in step S24.

In step S25, the software transmits the record to the touch pen 11 through the wireless communication channel. The record may be a file, a sentence, a word, a picture, or an internet link. Or, the software may utilize the touch device 10 to make a phone call and make the touch pen 11 receive an audio streaming from the touch device 10. It is worth mentioning that the touch pen 11 may further comprise an audio receiving unit and a speaker unit when the touch pen 11 is used for receiving the audio streaming.

In step S26, the touch pen 11 stores the record to the memorizing unit (not shown) or displays the record on the display unit 111 after receiving the record. The memorizing unit may be a register or non-volatile memory (e.g. flash memory). According to the steps S21~S26, the human operator can make the touch pen 11 store the data displayed on the touch device 10 or make the data displayed on the touch device 10 be displayed on the display unit 111 of the touch pen 11.

Second Embodiment

Figure 3:
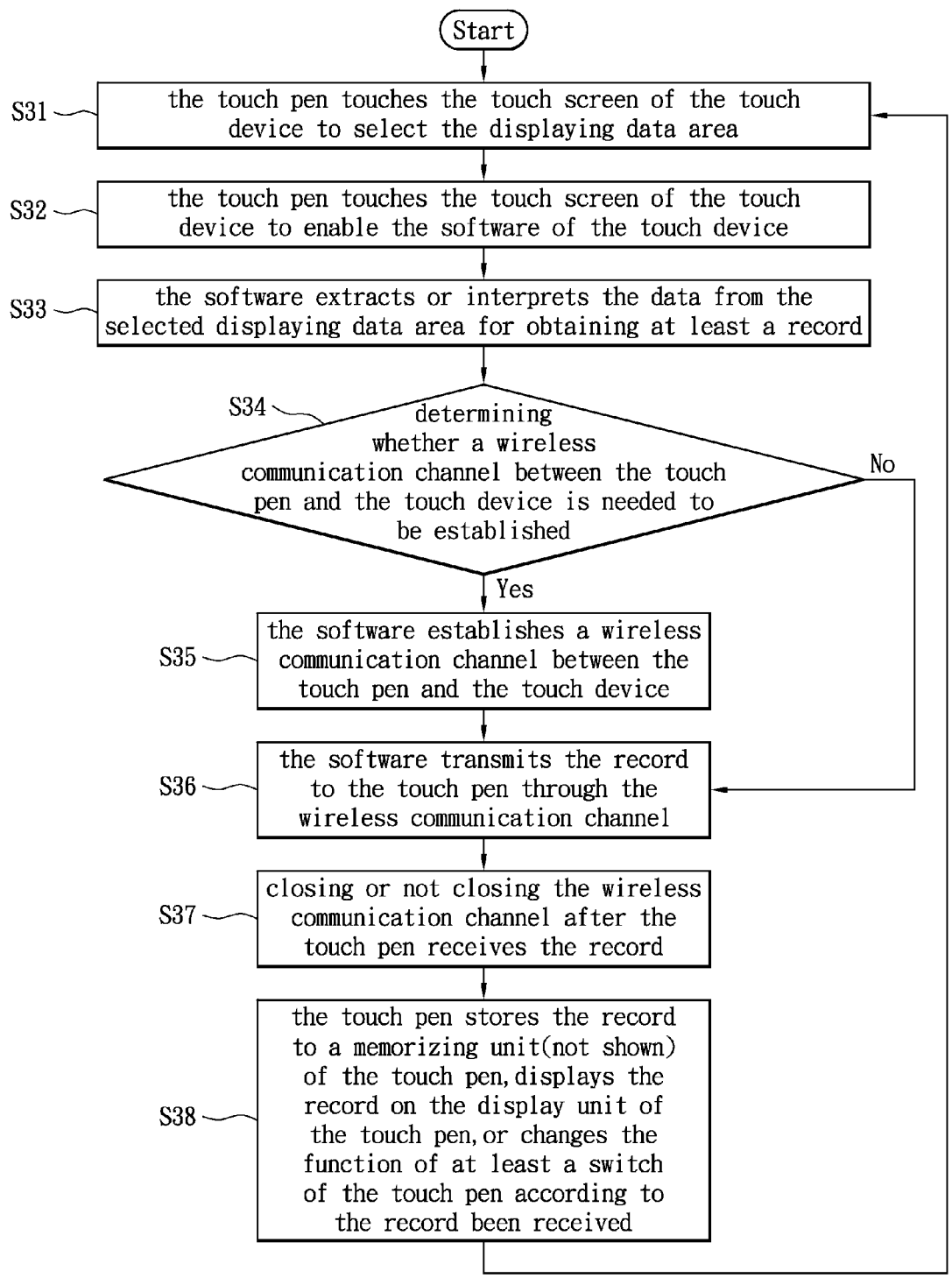
FIG. 3 shows a flow chart of a wireless transmission method for a touch pen with wireless storage and forwarding capability according to a second embodiment of the present invention.

Please refer to FIG. 1B and FIG. 3, FIG. 3 shows a flow chart of a wireless transmission method for a touch pen with wireless storage and forwarding capability according to a second embodiment of the present invention. In step S31, the touch pen 11 touches the touch screen 10a of the touch device 10 to select the displaying data area 103. Then, in the step S32, the touch pen 11 touches the touch screen 10a of the touch device 10 to enable the software of the touch device 10. In step S33, the software extracts or interprets the data from the selected displaying data area 103 for obtaining at least a record. The mentioned data can be a button menu for the switch 112 of the touch pen 11 or the data described in step S24 of the first embodiment.

In step S34, determining whether a wireless communication channel between the touch pen 11 and the touch device 10 is needed to be established, the wireless communication channel can be the wireless communication channel of the step S11 in the first embodiment. The step S34 is for determining whether a wireless communication channel between the touch pen 11 and the touch device 10 is established. When a wireless communication channel is established in the previous operation (e.g. before the step S11), another wireless communication channel is not needed to be established for reducing the occupation of the wireless communication channel and simplifying the communication process. In other words, the communication between the touch pen 11 and the touch device 10 can use a previously established (or predetermined) wireless communication channel.

It is worth mentioning that, in the step S34, the touch device 10 transmits the data (or record), thus it is more efficient that the software in the touch device 10 determines whether the wireless communication channel between the touch pen 11 and the touch device 10 is needed to be established. For example, when a wireless communication channel between the touch pen 11 and the touch device 10 is not established, the software can make the touch screen 10a to display an icon for indicating that a wireless communication channel is needed to be established, and the user can operate the switch 112 (e.g. push a button of the switch 112) on the touch pen 11 for establishing the wireless communication channel between the touch pen 11 and the touch device 10. However, this invention is not restricted thereto. The touch pen 11 may determines whether the wireless communication channel between the touch pen 11 and the touch device 10 is needed to be established. For example, after the step S33, the human operator switch the switch 112 on the touch pen 11 to make the touch pen 11 establish the wireless communication channel. After the step S34, if a wireless communication channel between the touch pen 11 and the touch device 10 is needed to be established, the step S35 is executed; otherwise, the step 36 is executed.

In step S35, the software establishes a wireless communication channel between the touch pen 11 and the touch device 10. In step S36, the software transmits the record to the touch pen 11 through the wireless communication channel. In step S37, closing or not closing the wireless communication channel after the touch pen receives the record. The software processed in the touch device 10 can configure whether to close or not to close the wireless communication channel link. Closing the wireless communication channel may reduce the occupied channel or save the power consumption of maintaining the channel. The step S37 provides a flexibility of the wireless linkage between the touch pen 11 and the touch device 10.

In step S38, the touch pen 11 stores the record to a memorizing unit (not shown) of the touch pen 11, displays the record on the display unit 111 of the touch pen 11, or changes the function of at least a switch (e.g. switch 112) of the touch pen 11 according to the record been received. Differing from the step S16 in the first embodiment, the step S38 changes the function of the switch of the touch pen 11. In other words, the operating mode of the touch pen 11 can be changed by changing the function of the switch 112 of the touch pen 11 according to the received record (e.g. data or command). When the record is a button menu for the switch 112 of the touch pen 11, the touch pen 11 can update the stored button menu (e.g. button menu stored in the memorizing unit) to change the function of the switch 112. For example, if the switch 112 has a button A, when the button A is pressed continuously for one second, the touch pen 11 can transmit a function of right-click of a mouse to the touch device 10 (on this condition the touch device can be a computer with touch-control capability). After updating the button menu, the function of the button A may be changed as transmitting a command to the touch device 10 to enable or start an application program (e.g. a multimedia player) when the button A is pressed.

The function of the switch 112 can be exemplary as following: switching the display data, switching the established wireless communication channel between the touch pen 11 and the touch device 10, or adjusting the sound volume of the speaker unit or the audio receiving unit (not shown) of the touch pen 11. Additionally, the switch 112 may control an application program of the touch device 10 through the wireless communication channel, thus the touch pen 11 can be a remote controller of the touch device 10.

Third Embodiment

Figure 4:
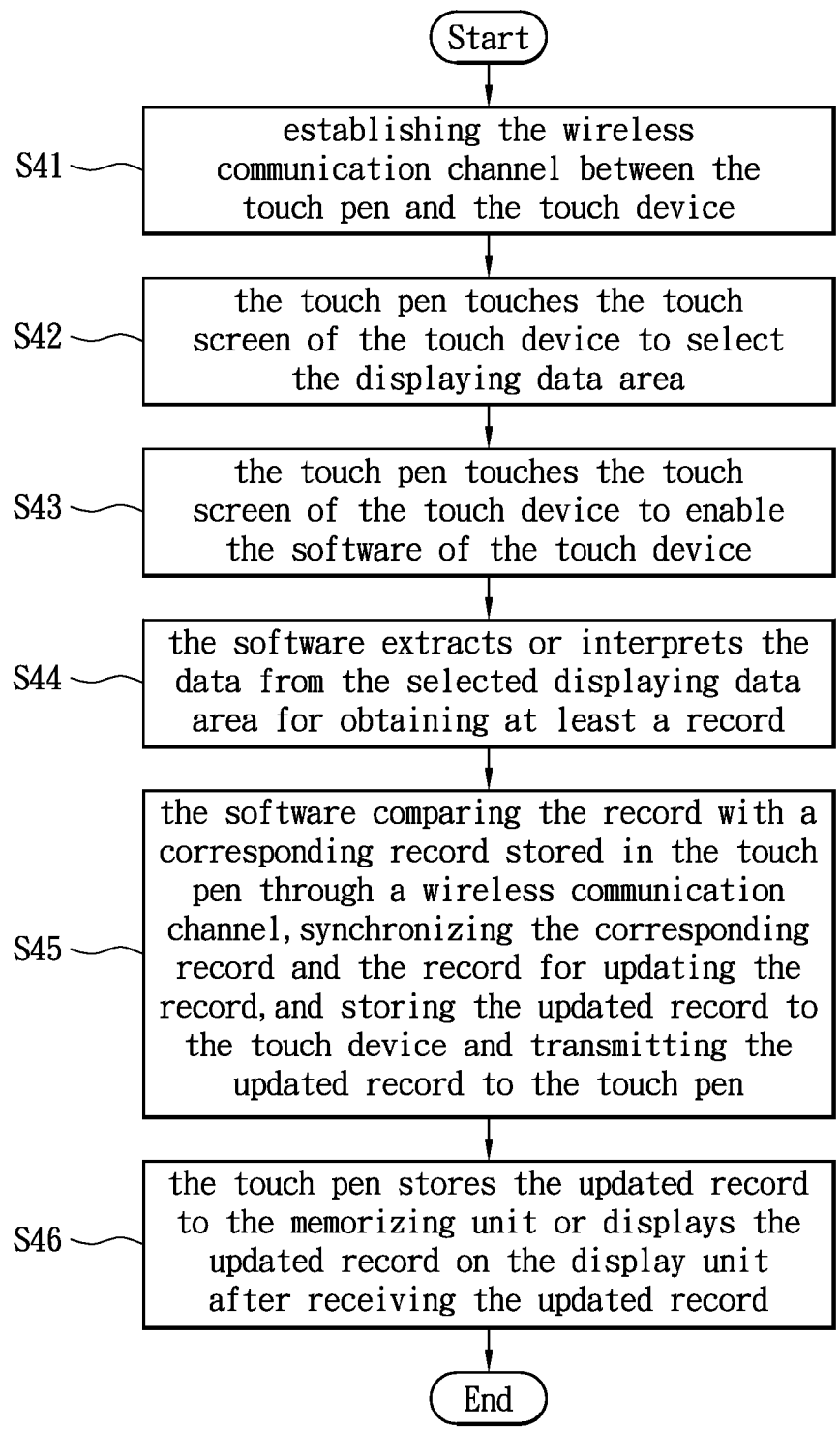
FIG. 4 shows a flow chart of a wireless transmission method for a touch pen with wireless storage and forwarding capability according to a third embodiment of the present invention.

Please refer to FIG. 1B and FIG. 4, FIG. 4 shows a flow chart of a wireless transmission method for a touch pen with wireless storage and forwarding capability according to a third embodiment of the present invention. In step S41, establishing the wireless communication channel between the touch pen 11 and the touch device 10. In step S42, the touch pen 11 touches the touch screen 10a of the touch device 10 to select the displaying data area 103. In step S43, the touch pen 11 touches the touch screen 10a of the touch device 10 to enable the software of the touch device 10. In step S44, the software extracts or interprets the data from the selected displaying data area 103 for obtaining at least a record. The mentioned data can be a firmware of the touch pen, an address book of the touch pen or the touch device, or the data described in the step S24 of the first embodiment.

In step S45, the software comparing the record with a corresponding record stored in the touch pen 11 through a wireless communication channel, synchronizing the corresponding record and the record for updating the record, and storing the updated record to the touch device 10 and transmitting the updated record to the touch pen 11. In other words, when the record is a firmware the firmware of the touch pen 11 can be updated accordingly. When the record is an address book, the address books of the touch pen 11 and the touch device 10 can be synchronized or updated. The mentioned address book can comprise telephone numbers, e-mail addresses, and the names of the corresponding people.

In step S46, the touch pen 11 stores the updated record to the memorizing unit (not shown) or displays the updated record on the display unit 111 after receiving the updated record. The step S46 is the same as the step S26 in the first embodiment. According to the steps S41~S46, the data stored in the touch pen 11 and the touch device 10 can be synchronized, and the touch pen 11 can store the latest data such as, a new firmware, or a new address book.

Fourth Embodiment

Figure 5A:
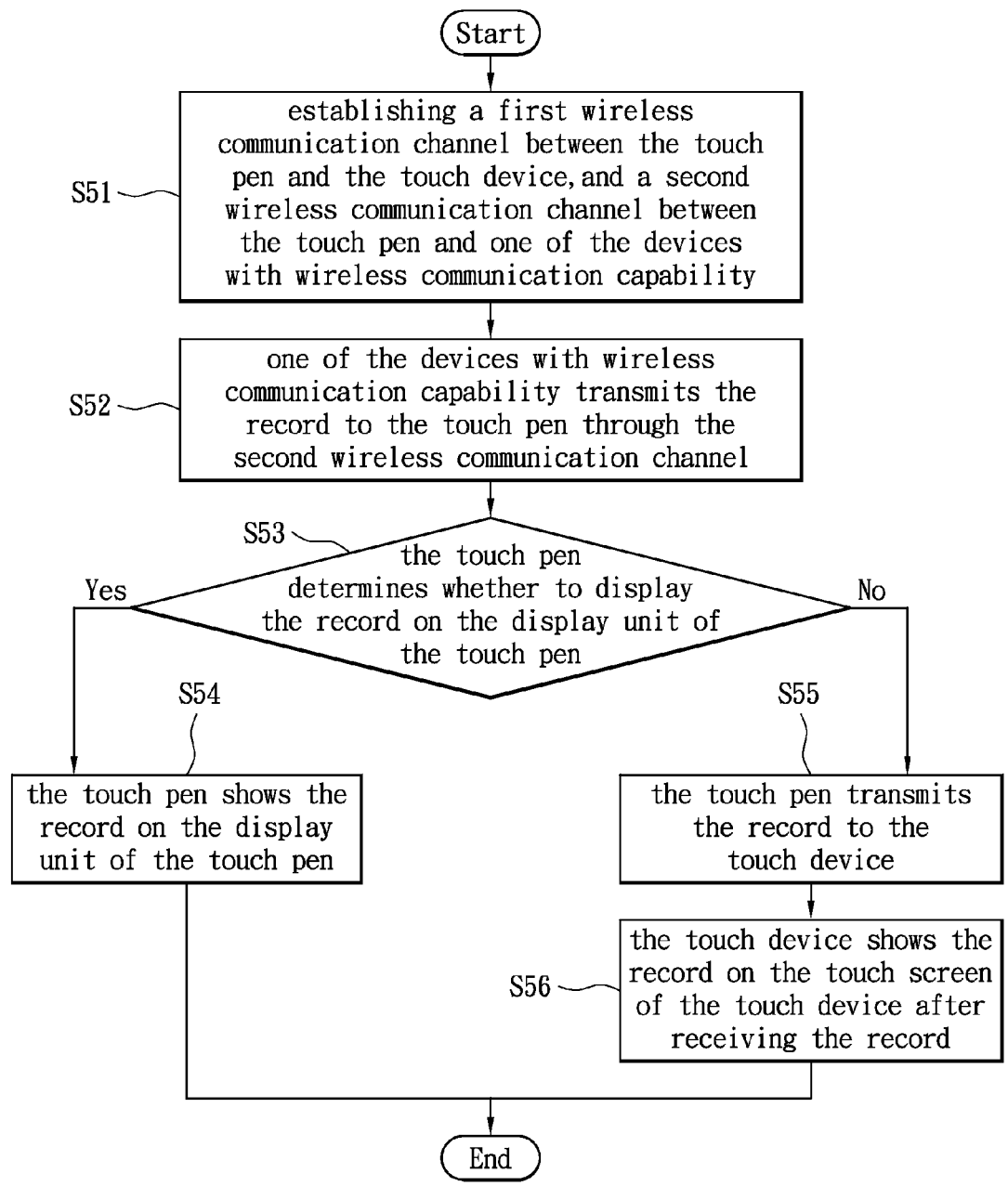
FIG. 5A shows a flow chart of a wireless transmission method for a touch pen with wireless storage and forwarding capability according to a fourth embodiment of the present invention.
Figure 5B:
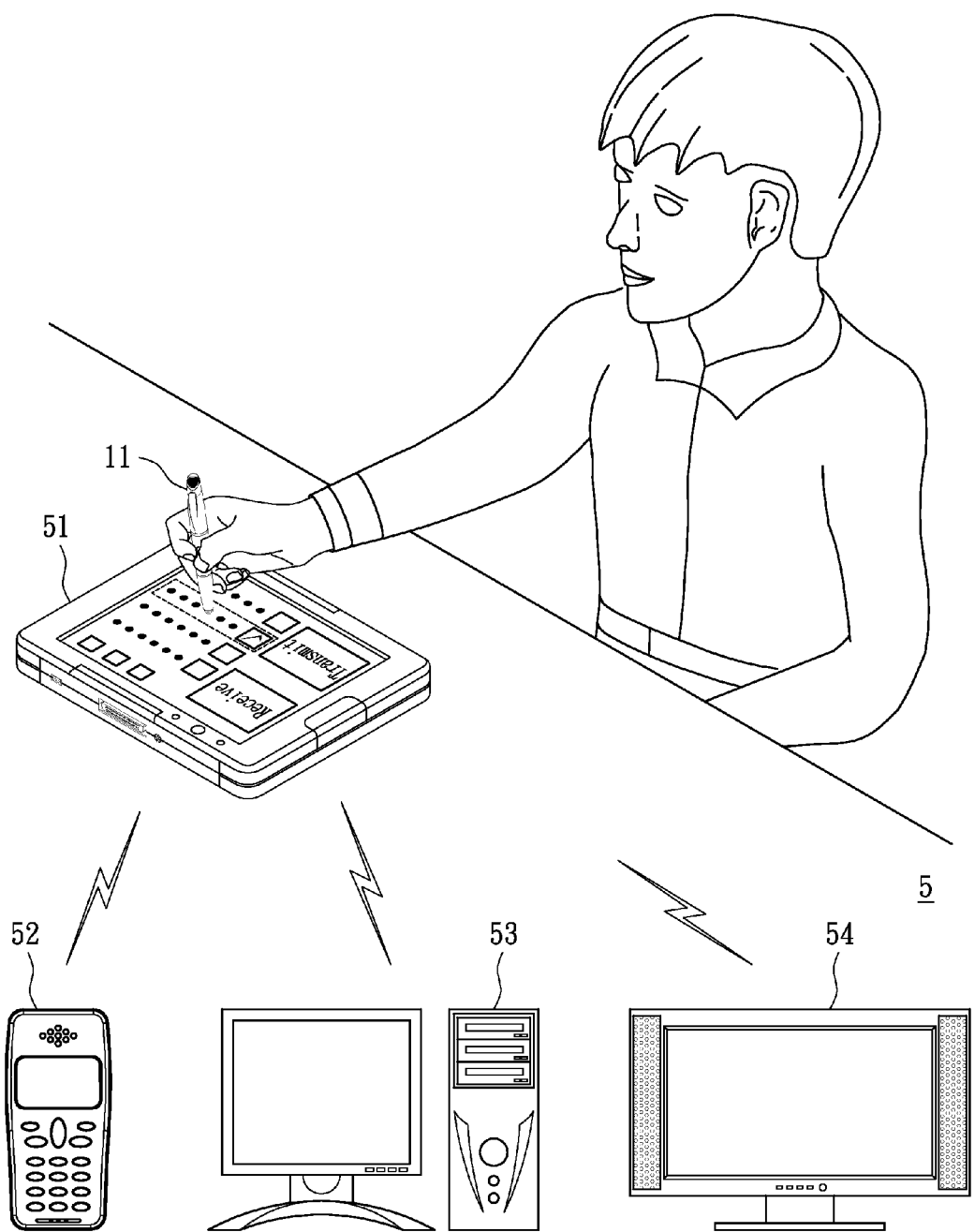
FIG. 5B shows a schematic diagram of a touch system according to a fourth embodiment of the present invention.

Please refer to FIG. 5A and FIG. 5B, FIG. 5A shows a flow chart of a wireless transmission method for a touch pen with wireless storage and forwarding capability according to a fourth embodiment of the present invention, FIG. 5B shows a schematic diagram of a touch system according to a fourth embodiment of the present invention. As shown in FIG. 5B, the touch system 5 comprises a touch device 51, a touch pen 11 and devices with wireless communication capability 52~54. The devices with wireless communication capability 52~54 can be a cell phone, a computer, or a smart home appliance. The touch device 51 can be the same as the touch device 10 in the first embodiment.

Please refer to FIG. 5A and FIG. 5B again; step S51 establishes a first wireless communication channel between the touch pen 11 and the touch device 51, and a second wireless communication channel between the touch pen 11 and one of the devices with wireless communication capability 52~54. In step S52, one of the devices with wireless communication capability 52~54 transmits the record to the touch pen 11 through the second wireless communication channel. It is worth mentioning that the step S52 can be the steps S22~S25 in the first embodiment. In step S53, the touch pen 11 determines whether to display the record on the display unit (not shown) of the touch pen 11. The determination of the touch pen 11 can be according to a predetermined configure, a real-time operation of the human operator, or the setting of the touch device 51. For example, when the touch pen 11 receives the record, the human operator can operate one button of the switch 112 on the touch pen 11 to show the record on the display unit. The human operator can also operate another button of the switch 112 on the touch pen 11 to not show the record. Or, the record is appointed to be shown on the display unit of touch pen 11. If the record is needed to be shown on the display unit of the touch pen 11, the step S54 is executed; otherwise, the step S55 is executed.

In step S54, the touch pen 11 shows the record on the display unit of the touch pen. In step S55, the touch pen 11 transmits the record to the touch device 51. In step 56, the touch device 51 shows the record on the touch screen of the touch device 51 after receiving the record.

According to the step S51~S56, the wireless transmission method of this embodiment transmits at least a record stored in the devices with wireless communication capability 52~54 to the touch device 51 or displays the record on the display unit of the touch pen 11. In other words, the wireless transmission method of this embodiment can complete the function of data forwarding, thus the data stored in the devices with wireless communication capability 52~54 can be transmitted to the touch device 51 through the touch pen 11. When the touch pen 11 receives data (or the record), the human operator can operate the switch of the touch pen to forward the data (or the record). Therefore, when the human operator operates the touch device 51 by the touch pen 11, the human operator can use the touch pen 11 to transmit or receive data (or the record) between the touch device 51 and the devices with wireless communication capability 52~54 without operating the devices with wireless communication capability 52~54. It is worth mentioning that when the touch pen 11 has more than one wireless communication module such as, a WiFi module and a Bluetooth module. The touch pen 11 can transmit the data (or the record) from a Bluetooth channel through a WiFi channel, and vice versa.

Fifth Embodiment

Figure 6:
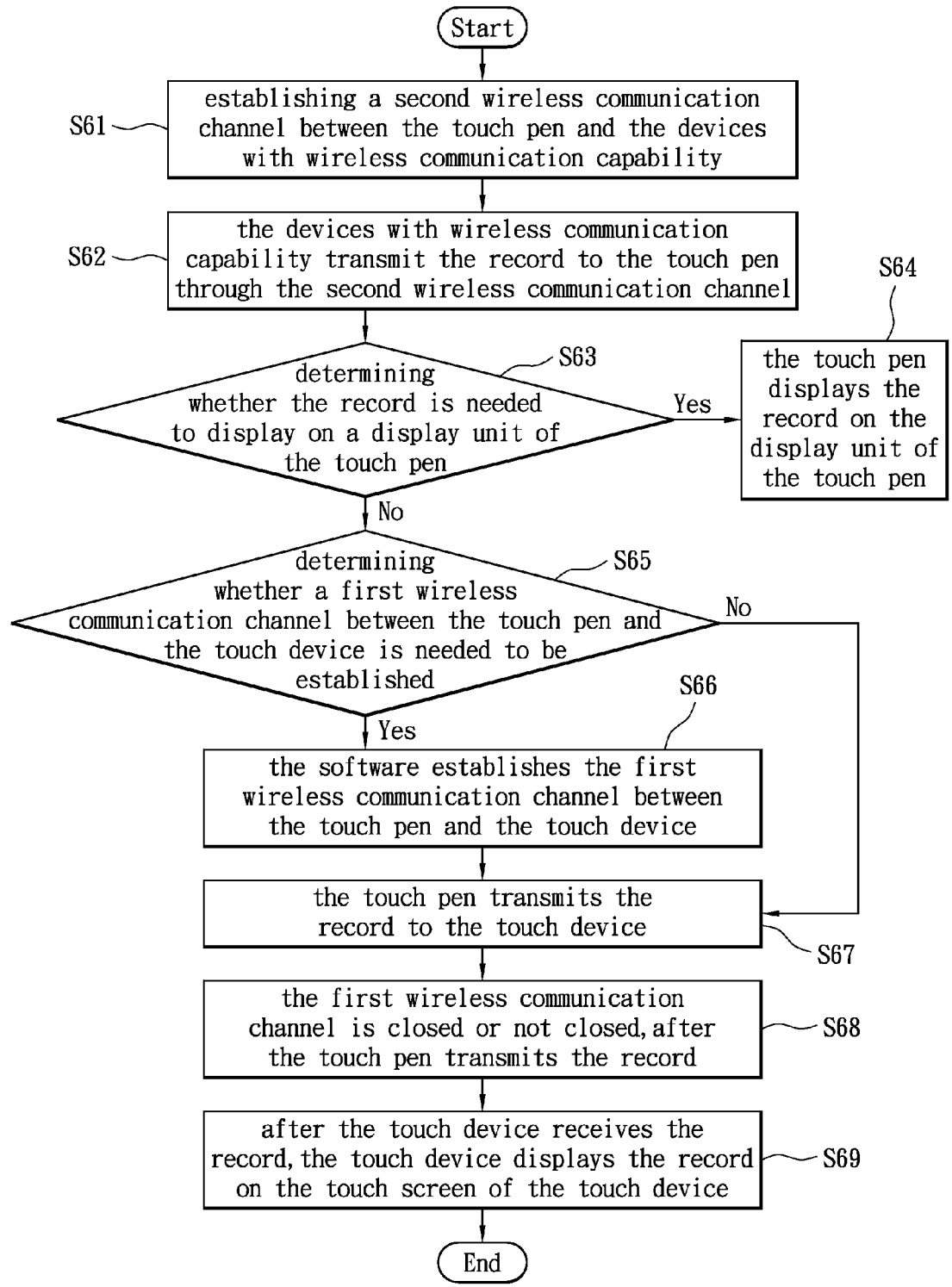
FIG. 6 shows a flow chart of a wireless transmission method for a touch pen with wireless storage and forwarding capability according to a fifth embodiment of the present invention.

Please refer to FIG. 5B and FIG. 6, FIG. 6 shows a flow chart of a wireless transmission method for a touch pen with wireless storage and forwarding capability according to a fifth embodiment of the present invention. In step S61, establishing a second wireless communication channel between the touch pen 11 and the devices with wireless communication capability 52~54. In step S62, the devices with wireless communication capability 52~54 transmit the record to the touch pen 11 through the second wireless communication channel. In step S63, determining whether the record is needed to display on a display unit of the touch pen 11. If it is needed to display the record on the display unit of the touch pen 11, the step S64 is executed; otherwise, the step S65 is executed. In step S64, the touch pen 11 displays the record on the display unit of the touch pen 11. The steps S61~S64 in this embodiment is the same as to the steps S51~S54 in the fourth embodiment.

In step S65, determining whether a first wireless communication channel between the touch pen 11 and the touch device 51 is needed to be established. The step S65 can be the same as to the step S34 in the second embodiment. If it is needed to establish the first wireless communication channel between the touch pen 11 and the touch device 51, the step S66 is executed; otherwise, the step S67 is executed. In step S66, the software establishes the first wireless communication channel between the touch pen 11 and the touch device 51. In step S67, the touch pen 11 transmits the record to the touch device 51. According to the steps S61~S67, the touch pen 11 can accomplish the function of data forwarding.

In step S68, the first wireless communication channel is closed or not closed, after the touch pen 11 transmits the record. The step S68 can be the same as to the step 37 in the second embodiment. In step S69, after the touch device 51 receives the record, the touch device 51 displays the record on the touch screen of the touch device 51. Accordingly, the touch device 51 can display at least a record (or the data) from the devices with wireless communication capability 52~54.

Sixth Embodiment

Figure 7:
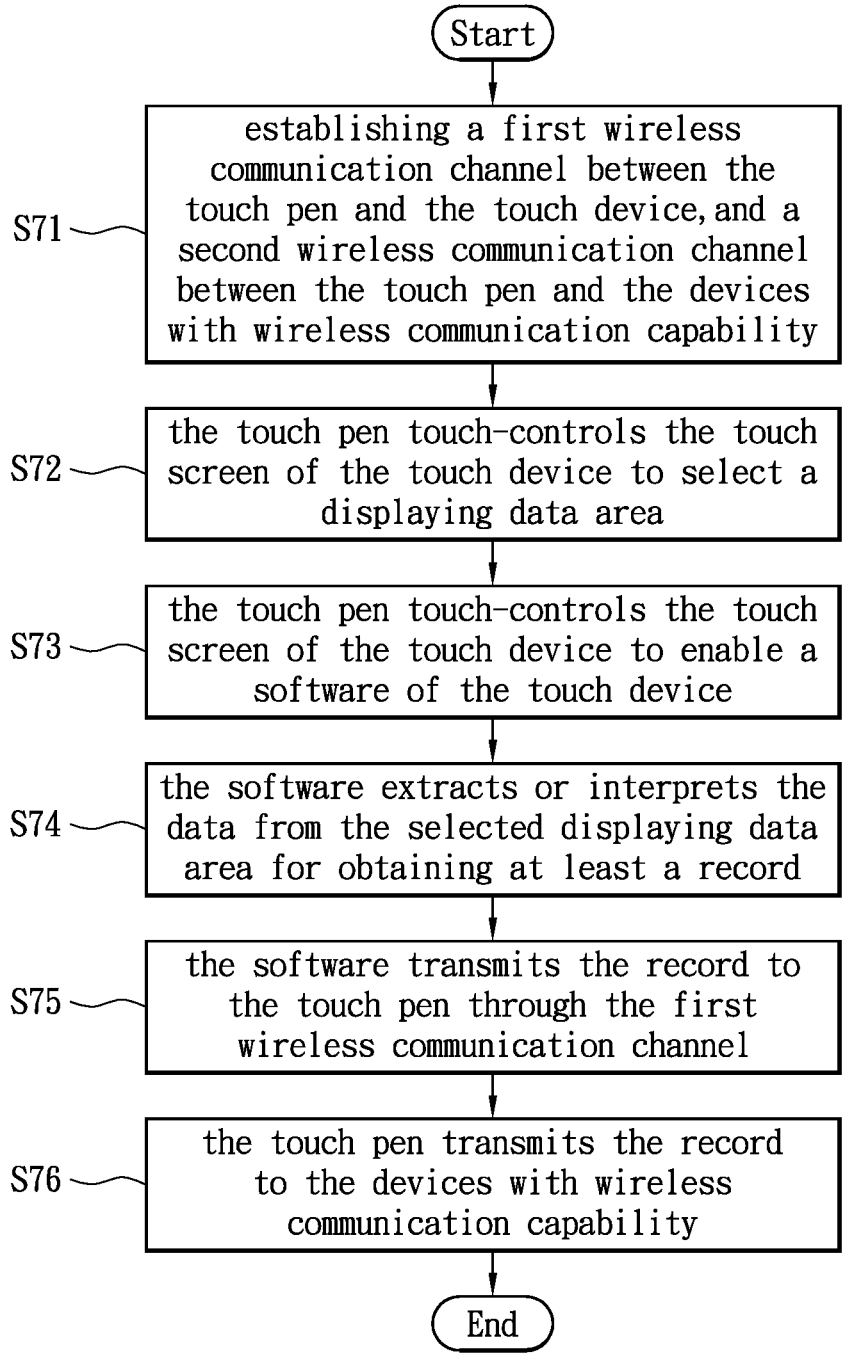
FIG. 7 shows a flow chart of a wireless transmission method for a touch pen with wireless storage and forwarding capability according to a sixth embodiment of the present invention.

Please refer to FIG. 5B and FIG. 7, FIG. 7 shows a flow chart of a wireless transmission method for a touch pen with wireless storage and forwarding capability according to a sixth embodiment of the present invention. Step S71 establishes a first wireless communication channel between the touch pen 11 and the touch device 51, and a second wireless communication channel between the touch pen 11 and the devices with wireless communication capability 52~54. The step S71 can be the same as to the step S51 in the fourth embodiment.

In step S72, the touch pen 11 touch-controls the touch screen of the touch device 51 to select a displaying data area. In step S73, the touch pen 11 touch-controls the touch screen of the touch device 51 to enable a software of the touch device 51. In the step S74, the software extracts or interprets the data from the selected displaying data area for obtaining at least a record. In step S75, the software transmits the record to the touch pen 11 through the first wireless communication channel. The steps S72~S75 can be the same as to the steps S22~S25 in the first embodiment.

In step S76, the touch pen 11 transmits the record to the devices with wireless communication capability 52~54. The step S76 is similar to the step S55 in the fourth embodiment, and the step S76 replaces the touch device with the devices with wireless communication capability 52~54. Accordingly, the human operator does not need to make a wireless link between the touch device 51 and the devices with wireless communication capability 52~54.

Seventh Embodiment

Figure 8:
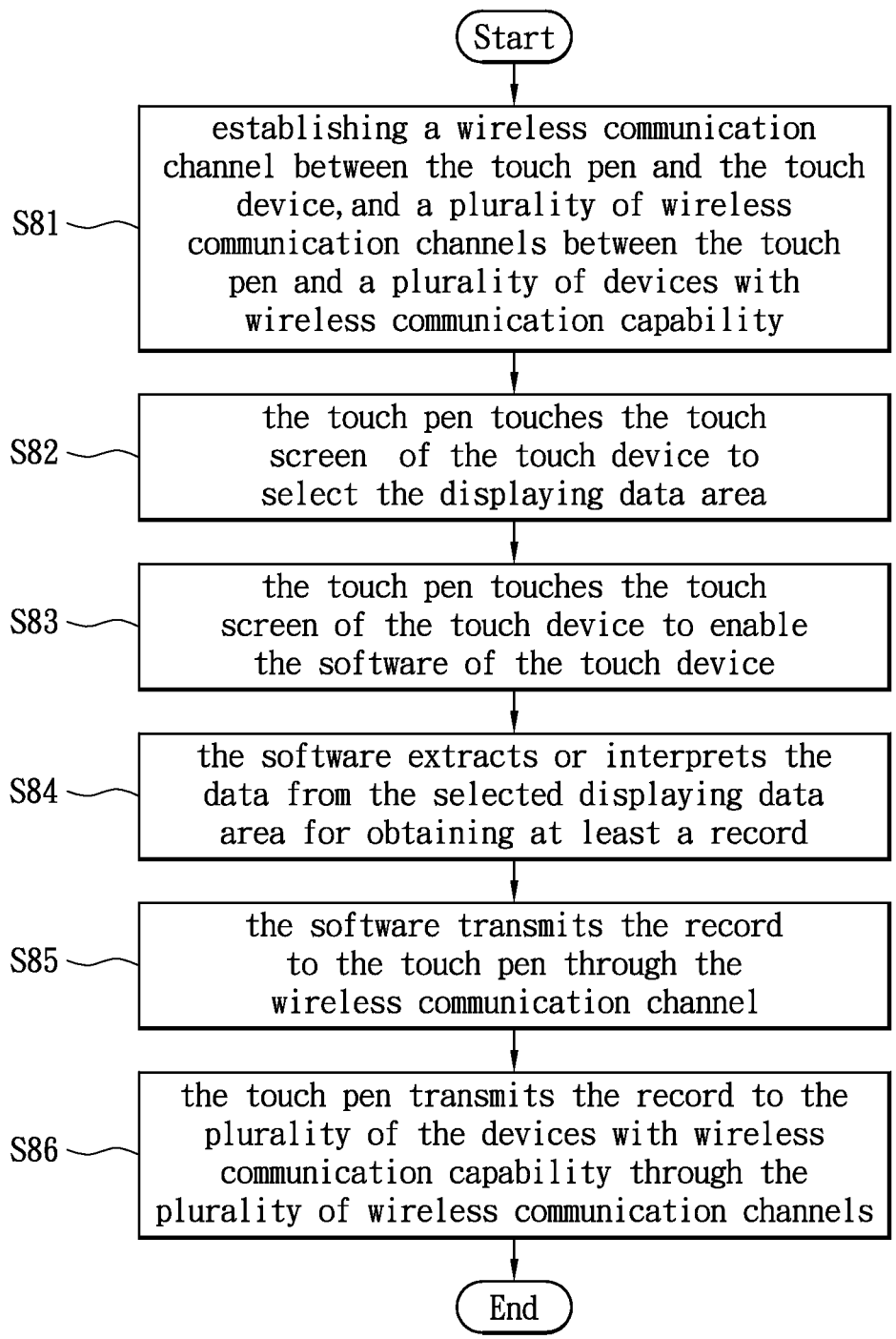
FIG. 8 shows a flow chart of a wireless transmission method for a touch pen with wireless storage and forwarding capability according to a seventh embodiment of the present invention.

Please refer to FIG. 1B and FIG. 8, FIG. 8 shows a flow chart of a wireless transmission method for a touch pen with wireless storage and forwarding capability according to a seventh embodiment of the present invention. The wireless transmission method in this embodiment is significantly identical to the sixth embodiment except that a plurality of wireless communication channels is established between the touch pen and a plurality of devices with wireless communication capability.

Step S81 establishes a wireless communication channel between the touch pen 11 and the touch device 10, and a plurality of wireless communication channels between the touch pen 11 and a plurality of devices with wireless communication capability. Then, executes the steps S82~S85, and the steps S82~S85 are the same as to the steps S22~S25 in the first embodiment, thus the redundant information is not repeated. In step S86, the touch pen transmits the record to the plurality of the devices with wireless communication capability through the plurality of wireless communication channels. For example, the human operator transmits the data stored in the touch device 51 to the device with wireless communication capability of each of the participants at the same time according to the steps S81~S86.

Eighth Embodiment

Figure 9:
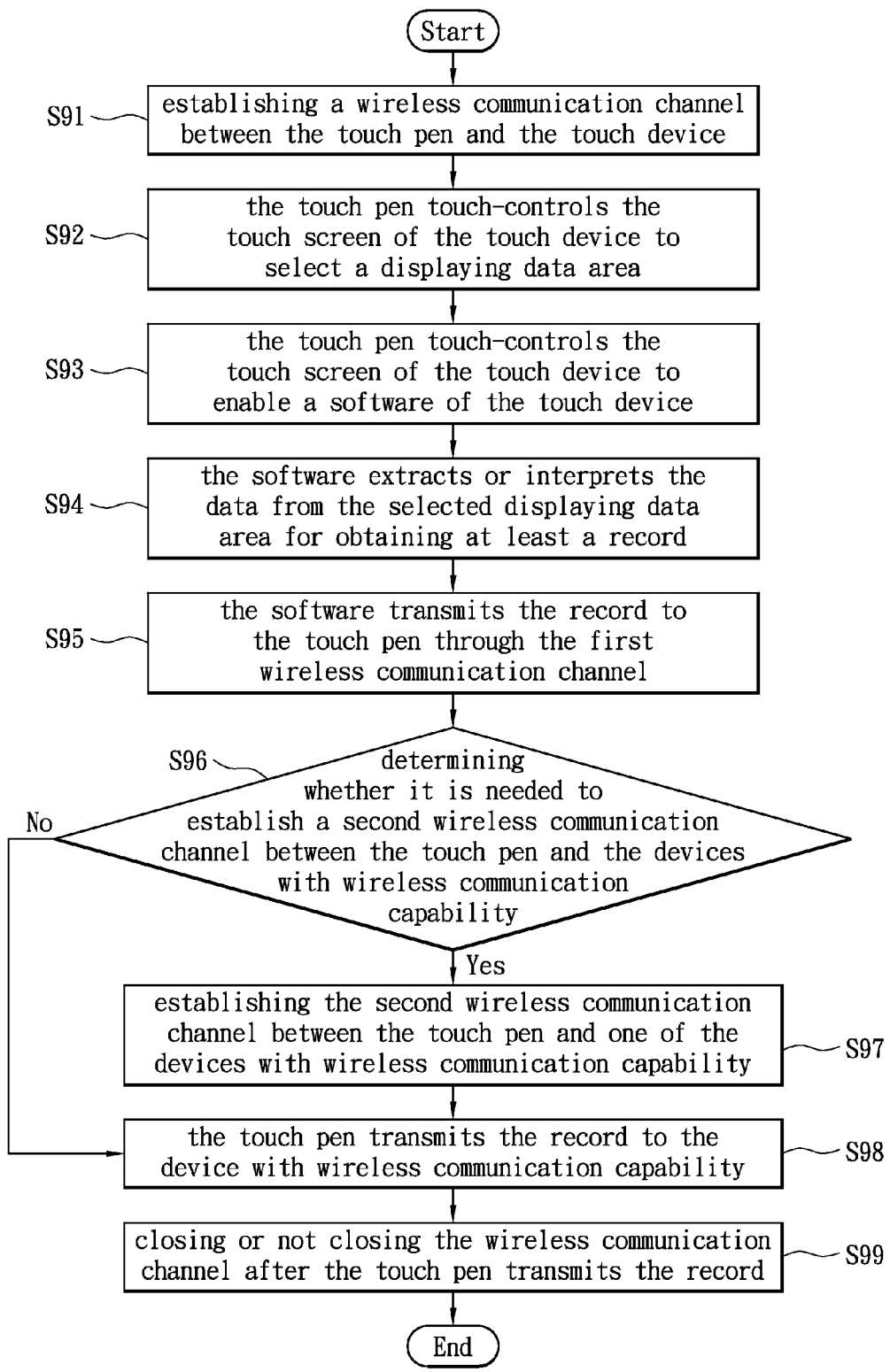
FIG. 9 shows a flow chart of a wireless transmission method for a touch pen with wireless storage and forwarding capability according to a eighth embodiment of the present invention.

Please refer to FIG. 5 and FIG. 9, FIG. 9 shows a flow chart of a wireless transmission method for a touch pen with wireless storage and forwarding capability according to a eighth embodiment of the present invention. The steps S91~S95 of this embodiment are significantly identical to the steps S71~S75 of the sixth embodiment except that the wireless communication channel between the touch pen 11 and any one of the devices with wireless communication capability 52~54 is not established in the step 91.

Step S96 determines whether it is needed to establish a second wireless communication channel between the touch pen 11 and the devices with wireless communication capability 52~54. If it is needed to establish the second wireless communication channel between the touch pen 11 and one of the devices with wireless communication capability 52~54, the step S97 is executed; otherwise, the step S98 is executed. Step S97 establishes the second wireless communication channel between the touch pen 11 and one of the devices with wireless communication capability 52~54. In step S98, the touch pen 11 transmits the record to the device with wireless communication capability. The steps S96~S98 is significantly identical to the steps S65~S67 in the fifth embodiment except that the touch device 51 is replaced with the devices with wireless communication capability 52~54. In step S99, closing or not closing the wireless communication channel after the touch pen 11 transmits the record. The closed (or not closed) wireless communication channel can be the first wireless communication channel, the second wireless communication channel, or both of these two channels. The human operator can configure the software to close the corresponding wireless communication channel after the transmission of the record is completed.

Ninth Embodiment

Figure 10:
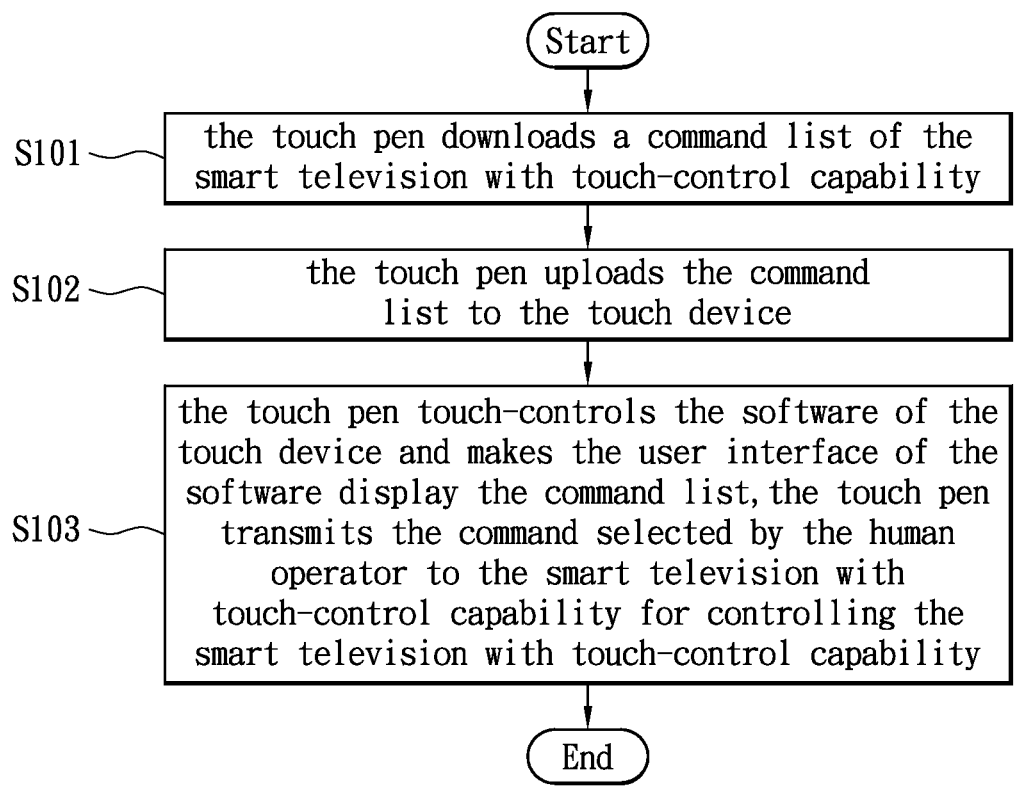
FIG. 10 shows a flow chart of a wireless transmission method for a touch pen with wireless storage and forwarding capability according to a ninth embodiment of the present invention.

Please refer to FIG. 10, FIG. 10 shows a flow chart of a wireless transmission method for a touch pen with wireless storage and forwarding capability according to a ninth embodiment of the present invention. This embodiment provides that the human operator can use the touch pen and the touch device to control a smart home appliance (e.g. a smart television). Usually, the smart home appliance has the capability of wireless communication and the smart home appliance may also have the capability of touch-control. The steps S101~S103 can also be applied to other kinds of smart home appliances such as, a stereo set, a washing machine, or an air conditioner.

In step S101, the touch pen downloads a command list of the smart television with touch-control capability. The human operator can use the touch pen to touch-control the smart television or just manipulate the smart television with touch-control capability to download the command list to the touch pen. In step S102, the touch pen uploads the command list to the touch device. The human operator can use the aforementioned wireless communication methods in the previous embodiments to transmit the command list stored in the touch pen to the touch device. In step S103, the touch pen touch-controls the software of the touch device and makes the user interface of the software display the command list, the touch pen transmits the command selected by the human operator to the smart television with touch-control capability for controlling the smart television with touch-control capability. In other words, the human operator can use the touch pen and the touch device to control the smart television with touch-control capability or other smart home appliance.

According to aforementioned embodiments, the touch pen can be used to receive or transmit the data stored in the touch device according to touch operation of the human operator. The function of the switch on the touch pen can be changed by the similar manner. The touch pen can be a medium for forwarding data when the human operator want to forward the data stored in the touch device to other devices, and accordingly the touch device does not need to communicate with other devices but the touch pen. Therefore, the human operator can make a gesture or gestures cooperated with the switch on the touch pen for wirelessly receiving, transmitting, and forwarding data. The touch pen with wireless storage and forwarding capability can integrate the touch operation and the process for the wireless transmission of data by the software installed in the touch device. The human operator can complete process of wirelessly receiving, transmitting, and forwarding data just by using the touch pen to touch-control the touch device as usual. Additionally, the touch pen and the touch device can also be a remote controller for a smart home appliance.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims

What is claimed is:

1. A wireless transmission method for a touch pen with wireless storage and forwarding capability, comprising:

the touch pen wirelessly receiving at least a record extracted from a displaying data area by a touch device when the touch pen touches to select the data display region shown on a touch screen of the touch device;

the touch pen storing the record; and the touch pen determining whether the record is needed to display on a display unit of the touch pen when the touch pen receives the record;

the touch pen displaying the record on the display unit of the touch pen if the record is needed to be displayed on the display unit of the touch pen;

the touch pen transmitting the record to a device with wireless communication capability if the record is not needed to be displayed on the display unit of the touch pen.

2. The wireless transmission method for a touch pen with wireless storage and forwarding capability according to claim 1, further comprising:

the touch pen storing the record to a memorizing unit.

3. The wireless transmission method for a touch pen with wireless storage and forwarding capability according to claim 2, further comprising:

using software to compare the record with a corresponding record stored in the touch pen through a wireless communication channel, updating the record.

4. The wireless transmission method for a touch pen with wireless storage and forwarding capability according to claim 1, further comprising:

determining whether a wireless communication channel between the touch pen and the touch device is needed to be established.

5. The wireless transmission method for a touch pen with wireless storage and forwarding capability according to claim 4, further comprising:
   establishing the wireless communication channel between the touch pen and the touch device by software, if it is needed, to establish the wireless communication channel between the touch pen and the touch device.

6. The wireless transmission method for a touch pen with wireless storage and forwarding capability according to claim 1, further comprising:
   determining whether it is needed to establish a second communication channel between the touch pen and the device with wireless capability;
   the software establishing the second wireless transmission channel between the touch pen and the device with wireless capability if it is needed to establish the second communication channel between the touch pen and the device with wireless capability;
   the touch pen communicating with the device with wireless capability through a predetermined wireless communication channel if it is not needed to establish the second communication channel between the touch pen and the device with wireless capability.

7. The wireless transmission method for a touch pen with wireless storage and forwarding capability according to claim 1, further comprising:
   the touch pen transmitting the received record to a device with wireless capability through a second wireless communication channel.

8. The wireless transmission method for a touch pen with wireless storage and forwarding capability according to claim 7, further comprising:
   closing or not closing the wireless communication channel after the touch pen receives the record.

9. The wireless transmission method for a touch pen with wireless storage and forwarding capability according to claim 1, further comprising:
   closing or not closing the wireless communication channel after the touch pen receives the record.

10. The wireless transmission method for a touch pen with wireless storage and forwarding capability according to claim 1, further comprising:
   the touch pen changing the function of at least a switch on the touch pen when the touch pen receives the record.

\* \* \* \* \*